United States Patent
Fukuoka et al.

(10) Patent No.: US 7,873,117 B2
(45) Date of Patent: *Jan. 18, 2011

(54) WIRELESS COMMUNICATION BASE STATION APPARATUS AND WIRELESS COMMUNICATION METHOD IN MULTICARRIER COMMUNICATION

(75) Inventors: Masaru Fukuoka, Ishikawa (JP); Kenichi Miyoshi, Kanagawa (JP); Sadaki Futagi, Ishikawa (JP); Atsushi Matsumoto, Ishikawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 393 days.

This patent is subject to a terminal disclaimer.

(21) Appl. No.: 11/915,732

(22) PCT Filed: May 29, 2006

(86) PCT No.: PCT/JP2006/310634

§ 371 (c)(1),
(2), (4) Date: Nov. 27, 2007

(87) PCT Pub. No.: WO2006/129585

PCT Pub. Date: Dec. 7, 2006

(65) Prior Publication Data

US 2009/0103648 A1     Apr. 23, 2009

(30) Foreign Application Priority Data

May 30, 2005    (JP) .............................. 2005-157452

(51) Int. Cl.
*H04L 27/00*    (2006.01)

(52) U.S. Cl. ..................................................... 375/295

(58) Field of Classification Search ................. 375/260, 375/285, 295, 296; 370/208, 210, 203, 343, 370/344
See application file for complete search history.

(56) References Cited

U.S. PATENT DOCUMENTS

| 2004/0190482 | A1* | 9/2004 | Baum et al. | 370/347 |
| 2006/0120473 | A1* | 6/2006 | Baum | 375/260 |
| 2009/0075700 | A1* | 3/2009 | Fukuoka et al. | 455/561 |

FOREIGN PATENT DOCUMENTS

EP    1630991    3/2006

OTHER PUBLICATIONS

International Search Report dated Aug. 15, 2006.
N. Maeda, et al. "Performance Comparisons between OFCDM and OFDM in a Forward Link Broadband Channel," Technical Report of IEICE, pp. 95-100, Aug. 2002.

* cited by examiner

*Primary Examiner*—Tesfaldet Bocure
(74) *Attorney, Agent, or Firm*—Dickinson Wright PLLC

(57) ABSTRACT

A base station apparatus wherein the interference suppression symbol combination can be performed in a case of using the repetition technique in a multicarrier communication. In a base station (100), a repetition part (103) repeats or copies each of data symbols received from a modulating part (102) to create a plurality of same data symbols. A phase rotating part (106) imparts, in accordance with a phase rotation angle set by a setting part (107), phase rotations to the pilot and data symbols received from a multiplexing part (105). At this moment, the phase rotating part (106) imparts the phase rotations of the same angle to the pilot and data symbols assigned to the same subcarrier. Further, the phase rotating part (106) causes the phase rotation difference between the same data symbols in a cell to be different from the phase rotation difference between the same symbols in an adjacent cell.

6 Claims, 15 Drawing Sheets

WIRELESS COMMUNICATION BASE STATION APPARATUS AND WIRELESS COMMUNICATION METHOD IN MULTICARRIER COMMUNICATION

TECHNICAL FIELD

The present invention relates to a wireless communication base station apparatus and a wireless communication method in multicarrier communication.

BACKGROUND ART

In the field of wireless communication, especially in mobile communication, a variety of information such as image and data in addition to voice is becoming an object of transmission in recent years. It is anticipated that the demand for high-speed transmission becomes further increased in the future, and to perform high-speed transmission, a wireless transmission scheme, which utilizes limited frequency resources more effectively and achieves high transmission efficiency, has been required.

OFDM (Orthogonal Frequency Division Multiplexing) is one of wireless transmission techniques, for meeting these requirements. OFDM is one of multicarrier communication techniques, whereby data is transmitted in parallel using a large number of subcarriers, and it is known that OFDM provides high frequency use efficiency and reduce inter-symbol interference under a multipath environment and is effective to improve transmission efficiency.

Moreover, in OFDM, cases occur where quality varies significantly per subcarrier due to frequency selective fading caused by multipath. In this case, signals allocated to subcarriers located in a fading valley shows poorer quality and are difficult to demodulate, so that it is necessary to improve quality so as to enable demodulation.

Repetition technique is one of techniques to improve quality in OFDM. The repetition technique refers to a technique of creating a plurality of the same symbols by duplicating (repeating) a given symbol, and allocating and transmitting the plurality of the same symbols to different subcarriers or at different timings. A receiving side acquires diversity gain by maximum-ratio-combination of those of the same symbols (see, for example, Non-patent Document 1).

Non-patent Document 1: "Performance Comparions between OFCDM and OFDM in a Forward Link Broadband Channel", Maeda, Atarashi, Kishiyama, and Sawahashi, Technical report of IEICE., RCS2002-162, August 2002.

DISCLOSURE OF INVENTION

Problems to be Solved by the Invention

Here, a wireless communication mobile station apparatus (hereinafter simply a "mobile station") located near cell boundary is subject to significant influence of interference from neighboring cells (colored interference), even if a wireless communication base station apparatus (hereinafter simply a "base station") maximum-ratio-combines the plurality of the same symbols subject to repetition, and so required quality is not necessarily achieved.

Then, to reduce this interference effectively, it is assumed that MMSE (Minimum Mean Square Error)-based interference reducing symbol combining (hereinafter referred to as "MMSE combining") is performed on a plurality of the same symbols.

However, when a plurality of the same symbols are allocated to a plurality of neighboring subcarriers in a base station, due to high correlation in channel variation between neighboring subcarriers, reception is performed by a mobile station so that phase differences between a desired wave and an interferencing wave are substantially the same angle between neighboring subcarriers. The case is assumed, for example, where phase difference $\theta_1$ between the desired wave and the interfering wave in subcarrier $f_1$, happens to have a similar angle of phase difference $\theta_2$ between the desired wave and the interfering wave in subcarrier $f_2$.

By this means, when phase difference $\theta_1$ in subcarrier $f_1$ causes to have a similar angle of phase difference $\theta_2$ in subcarrier $f_2$, in the mobile station a matrix to calculate weights using MMSE combining, that is, a cross-correlation matrix of received symbols, does not have an inverse matrix. Consequently, the mobile station may not calculate the weights and may not perform MMSE combining.

It is therefore an object of the present invention to provide a wireless communication base station apparatus and a wireless communication method that can perform interference reducing symbol combining, when a repetition technique is used in multicarrier communication.

Means for Solving the Problem

The base station apparatus of the present invention transmits multicarrier signals formed with a plurality of subcarriers to a wireless communication mobile station apparatus, and employs a configuration having: a repetition section that repeats a symbol and generates a plurality of same symbols; a phase rotation section that applies a phase rotation to the plurality of the same symbols; and a transmission section that transmits the multicarrier signal in which the plurality of the same symbols after the phase rotation are allocated to the plurality of subcarriers, and, in this base station, the phase rotation section makes a phase rotation difference between the plurality of the same symbols different from a phase rotation difference between same symbols in a neighboring cell or sector.

Advantageous Effect of the Invention

According to the present invention, when a repetition technique is used in multicarrier communication, it is possible to perform interference reducing symbol combining in a mobile station.

BEST MODE FOR CARRYING OUT THE INVENTION

Embodiments of the present invention will be explained below in detail with reference to the accompanying drawings.

Embodiment 1

According to the present embodiment, a base station applies phase rotation such that phase rotation difference between a plurality of the same symbols generated by repetition is different in neighboring cells or neighboring sectors.

Figure 1:
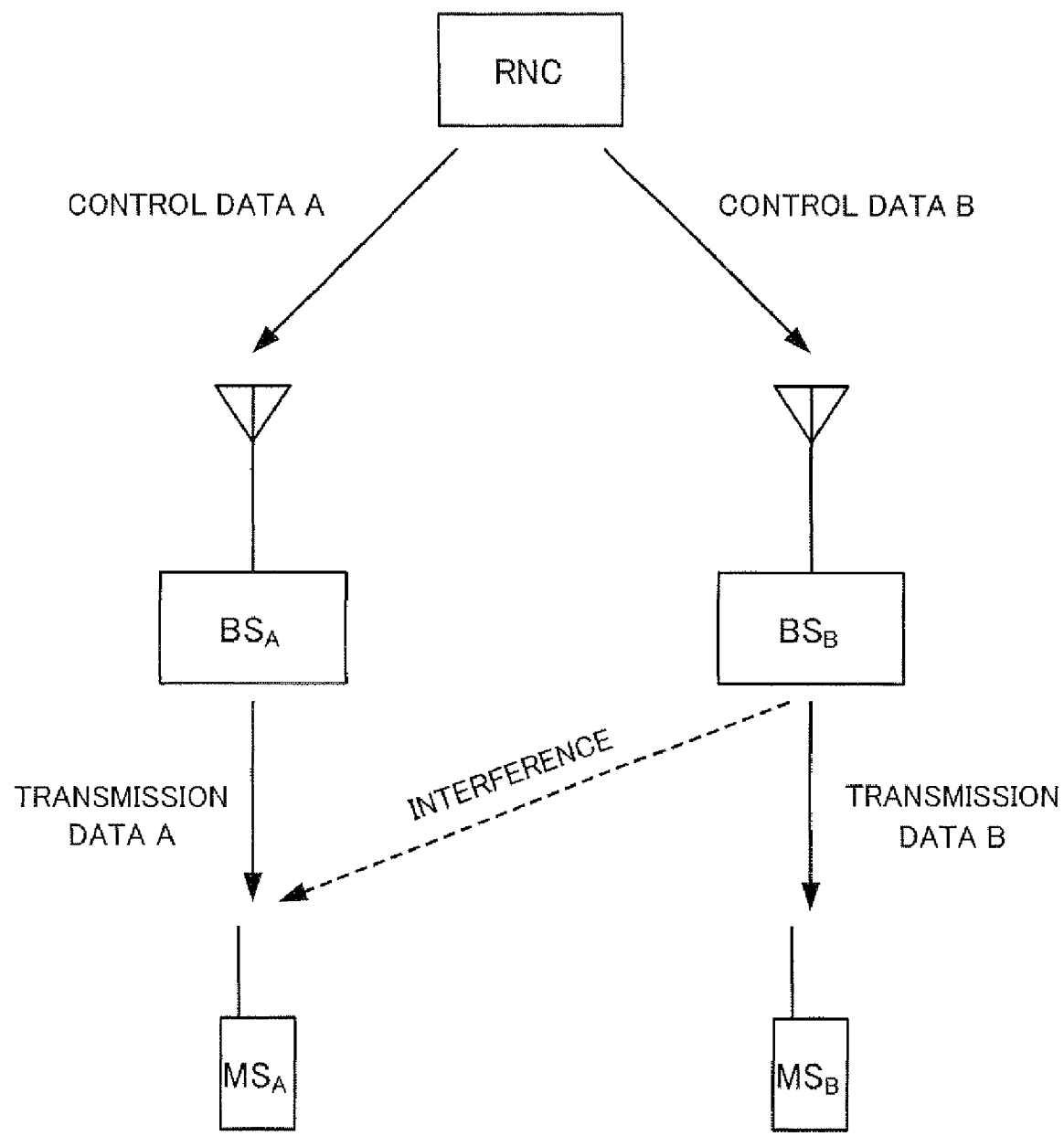
FIG. 1 illustrates a configuration of a mobile communication system according to Embodiment 1 of the present invention.

First, FIG. 1 shows the configuration of a mobile communication system according to the present embodiment.

As shown in FIG. 1, a wireless network control apparatus (hereinafter simply a "control apparatus") RNC (Radio Network Controller) transmits control data A to base station $BS_A$ of cell A and transmits control data B to base station $BS_B$ of cell B. Control data A includes phase rotation angle A, which is unique to base station $BS_A$, and control data B includes phase rotation angle B, which is unique to base station $BS_B$. In addition, phase rotation angle A and phase rotation angle B are different.

Base station $BS_A$ applies phase rotation to a plurality of the same symbols generated by repetition, according to phase rotation angle A specified by the control station RNC. Likewise, base station $BS_B$ applies phase rotation to a plurality of the same symbols generated by repetition, according to phase rotation angle B specified by the control station RNC. Base stations $BS_A$ and $BS_B$ apply phase rotation with different phase rotation angles A and B, so that the phase rotation differences between a plurality of the same symbols vary between neighboring cells.

Then, base station $BS_A$ transmits the transmission data A after phase rotation to mobile station $MS_A$, which is located in cell A of base station $BS_A$, and base station $BS_B$ transmits the transmission data B after phase rotation to mobile station $MS_B$, which is located in cell B of base station $BS_B$. When cell A and cell B are adjacent to each other and mobile station $MS_A$ is located near the cell boundary of cell A, mobile station $MS_A$ receives transmission data A as desired wave and at the same time receives transmission data B as interfering wave. Then, by MMSE combining of these data, mobile station $MS_A$ reduces the interfering wave from base station $BS_B$.

Figure 2:
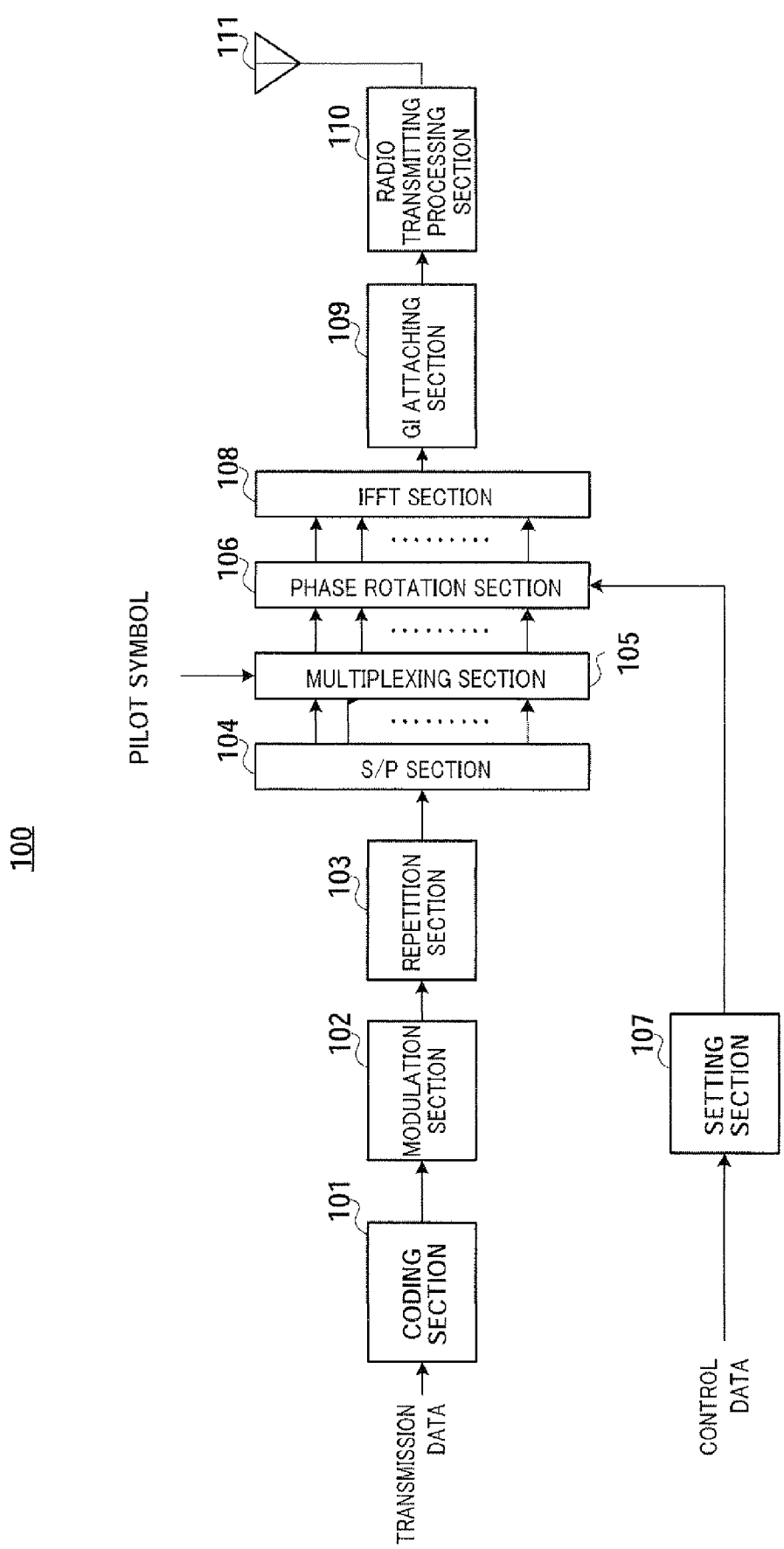
FIG. 2 is a block diagram showing a configuration of a base station according to Embodiment 1 of the present invention.

Next, FIG. 2 shows the configuration of base station apparatus 100 according to the present embodiment. According to the present embodiment, base station $BS_A$ and base station $BS_B$ both employ the configuration shown in FIG. 2.

In base station 100, coding section 101 performs coding processing on inputted transmission data (i.e. bit sequence), and modulation section 102 performs modulation processing on the transmission data after coding by modulation schemes including QPSK and 16 QAM and generates symbols.

Repetition section 103 duplicates each data symbol inputted from modulation section 102, generates a plurality of the same data symbols and outputs these symbols to S/P section (serial-to-parallel conversion section) 104. Incidentally, this plurality of same symbols form one unit, referred to as the "repetition unit".

S/P conversion section 104 converts the data symbol sequence inputted from repetition section 103 in serial into in parallel and outputs the data symbols multiplexing section 105. By this serial-to-parallel conversion, the data symbols are allocated to a plurality of subcarriers forming a multicarrier signal. At this time, S/P section 104 allocates a plurality of the same data symbols to neighboring subcarriers.

Every time a predetermined number of data symbols (for example, one frame) are inputted, multiplexing section 105 selects and outputs the pilot symbols, thereby time multiplexing the data symbols and the pilot symbols.

Phase rotation section 106 applies phase rotation to the pilot symbols and data symbols inputted from multiplexing section 105, according to the phase rotation angle set by setting section 107. At this time, phase rotation section 106 applies phase rotation at the same angle to the pilot symbol and the data symbol allocated to the same subcarrier. Phase rotation will be described in detail later. The symbols after phase rotation are outputted to IFFT (Inverse Fast Fourier Transform) section 108.

Setting section 107 acquires the phase rotation angle for each base station included in the control data received from control station RNC shown in FIG. 1, and sets this phase rotation angle in phase rotation section 106.

IFFT section 108 performs IFFT on a plurality of subcarriers where the pilot symbol or the data symbol is allocated, and acquires an OFDM symbol, which is a multicarrier signal.

GI attaching section 109 attaches the same signal as the tail part of an OFDM symbol, to the beginning of that OFDM symbol, to provide a guard interval ("GI").

Radio transmitting processing section 110 performs transmission processing including D/A conversion, amplification and up-conversion, on the OFDM symbol with an attachment of a GI, and transmits the result from antenna 111 to mobile station MS.

Figure 3:
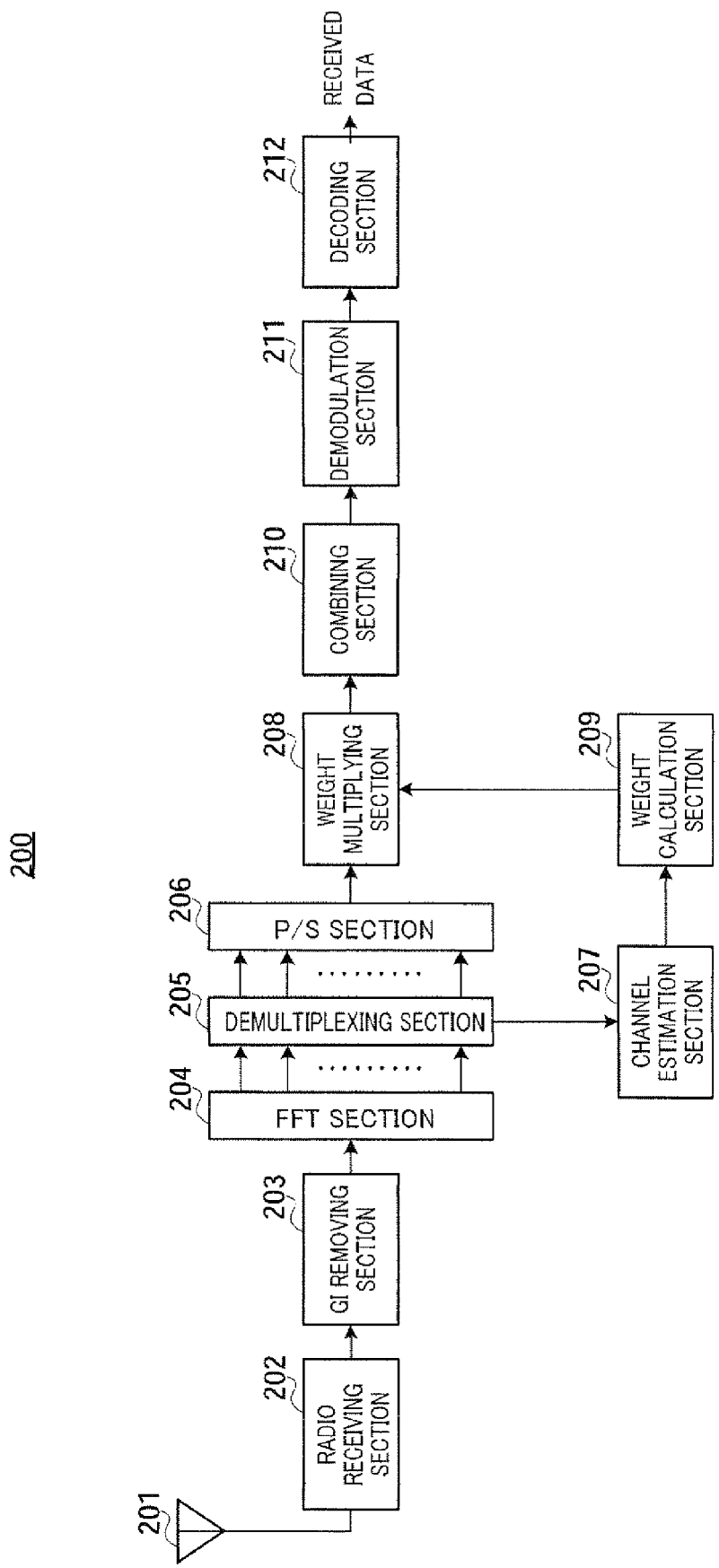
FIG. 3 is a block diagram showing the configuration of a mobile station according to Embodiment 1 of the present invention.

Next, FIG. 3 shows the configuration of mobile station 200 according to the present embodiment. The mobile stations MS shown in FIG. 1 employ the configuration shown in FIG. 3.

An OFDM symbol received via antenna 201 in mobile station 200 is subjected to receiving processing including down-conversion and D/A conversion in radio receiving section 202, and then has the GI removed in GI removing section 203 and is inputted to FFT (Fast Fourier Transform) section 204.

FFT section 204 performs FFT on the OFDM symbol, extracts symbols allocated to the subcarriers and outputs symbols equaling one OFDM symbol, to demultiplexing section 205 in parallel.

Demultiplexing section 205 divides the symbols inputted from FFT section 204 into pilot symbols and data symbols, outputs the data symbols to P/S section (parallel-to-serial conversion section) 206 and the pilot symbols to channel estimation section 207.

P/S section 206 converts the data symbol sequence inputted from demultiplexing section 205 in parallel into serial and outputs the result to weight multiplying section 208.

Channel estimation section 207 determines the channel estimation value (for example, channel variation level) for each subcarrier using the pilot symbols, and outputs the channel estimation values with the pilot symbols to weight calculation section 209.

Weight calculation section 209 calculates MMSE-based interference reducing weight from the pilot symbols and the channel estimation values and outputs the calculation result to weight multiplying section 208.

Weight multiplying section 208 multiplies the data symbols by the interference reducing weight and outputs the result to combining section 210.

Combining section 210 combines the data symbols multiplied by the interference reducing weight on a per repetition unit basis, that is, combines the same data symbols generated by the repetition in base station 100. By this means, MMSE combining is performed.

The symbols after MMSE combining are demodulated by demodulation section 211 and decoded by decoding section 212. By this means, received data is acquired.

Next, phase rotation will be explained in detail.

Figure 4:
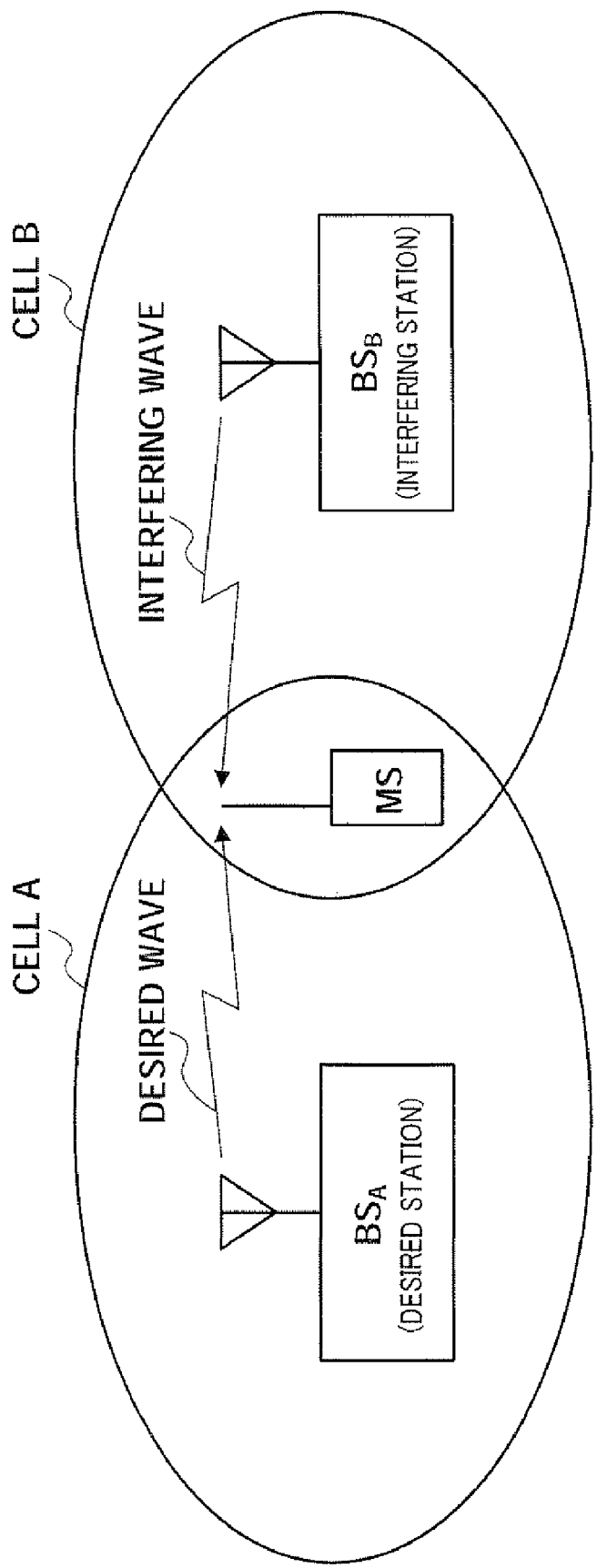
FIG. 4 shows an example of cell arrangement (two cell model) according to Embodiment 1 of the present invention.

First, as shown in FIG. 4, a case will be explained where mobile station MS is engaged in communication with base station $BS_A$ in cell A and is located near the cell boundary of cell A. A case will be also explained where cell B is the only neighboring cell of cell A. Consequently, in FIG. 4, base station $BS_A$ is the desired station and $BS_B$ is the interfering station, for mobile station MS. That is, an OFDM symbol transmitted from base station $BS_A$ is a desired wave and an OFDM symbol transmitted from base station $BS_B$ is an interfering wave.

Figure 5A:
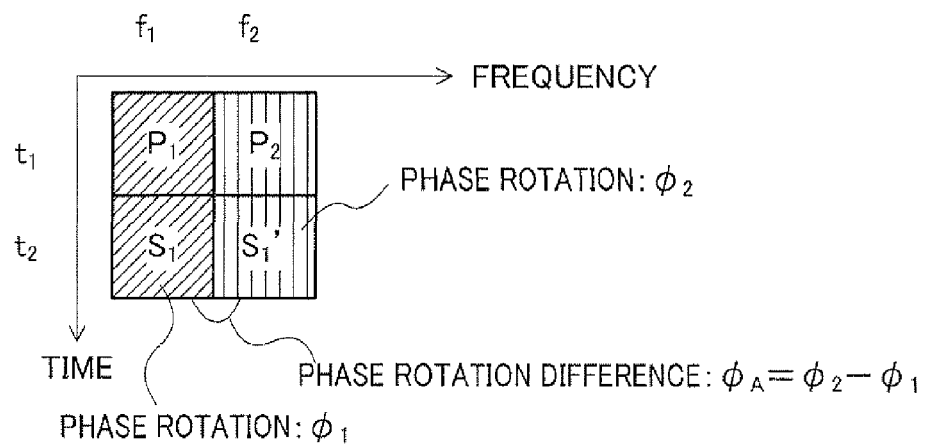
FIG. 5A illustrates a phase rotation (base station $BS_A$) according to Embodiment 1 of the present invention.

As shown in FIG. 5A, base station $BS_A$ applies a phase rotation at a phase rotation angles ($\phi_1$ and $\phi_2$) designated by control station RNC, to pilot symbols $P_1$ and $P_2$, and the same data symbols $S_1$ and $S_1'$ (where "$S_1'$" is the same data symbol as $S_1$, generated by repeating $S_1$). At this time, base station $BS_A$ applies phase rotation at the same angle $\phi_1$, to pilot symbol $P_1$ and data symbol $S_1$, which are allocated to the same subcarrier $f_1$ at different times $t_1$ and $t_2$. Likewise, base station $BS_A$ applies the phase rotation at the same angle $\phi_2$ to pilot symbol $P_2$ and data symbol $S_1'$, which are allocated to the same subcarrier $f_2$ at different times $t_1$ and $t_2$. Consequently, the phase rotation difference between pilot symbols $P_1$ and $P_2$ and the phase rotation difference between data symbols $S_1$ and $S_1'$ are both $\phi_A = \phi_2 - \phi_1$.

Figure 5B:
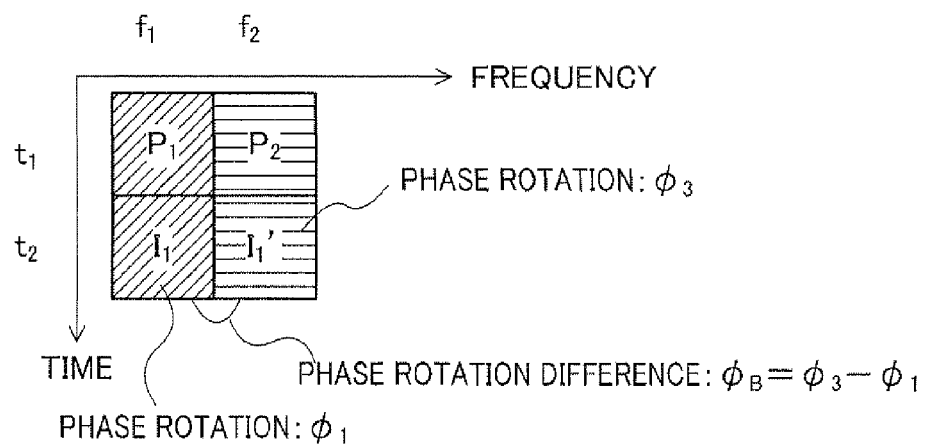
FIG. 5B illustrates a phase rotation (base station $BS_B$) according to Embodiment 1 of the present invention.

Meanwhile, as shown in FIG. 5B, base station $BS_B$ applies a phase rotation at phase rotation angles ($\phi_1$ and $\phi_3$) designated by control station RNC, to pilot symbols $P_1$ and $P_2$, and the same data symbols $I_1$ and $I_1'$. Incidentally, $\phi_2$ is not equal to $\phi_3$. At this time, base station $BS_B$ applies phase rotation at the same angle $\phi_1$ to pilot symbol $P_1$ and data symbol $I_1$, which are allocated to the same subcarrier $f_1$, at different times $t_1$ and $t_2$. Likewise, base station $BS_A$ applies phase rotation at the same angle $\phi_3$, to pilot symbol $P_2$ and data symbol $I_1'$ which are allocated to the same subcarrier $f_2$ at different times $t_1$ and $t_2$. Consequently, the phase rotation difference between pilot symbols $P_1$ and $P_2$ and the phase rotation difference between data symbols $S_1$ and $S_1'$ are both $\phi_B = \phi_3 - \phi_1$.

Consequently, between neighboring cells, the phase rotation difference ($\phi_A$) between the same symbols in the desired wave (that is, between data symbols $S_1$ and $S_1'$) and the phase rotation difference ($\phi_B$) between the same symbols in the interfering wave (that is, between symbols $I_2$ and $I_1'$) are different. Then, an OFDM symbol including the symbols applied to phase rotation in this way is received by mobile station MS.

Figure 6:
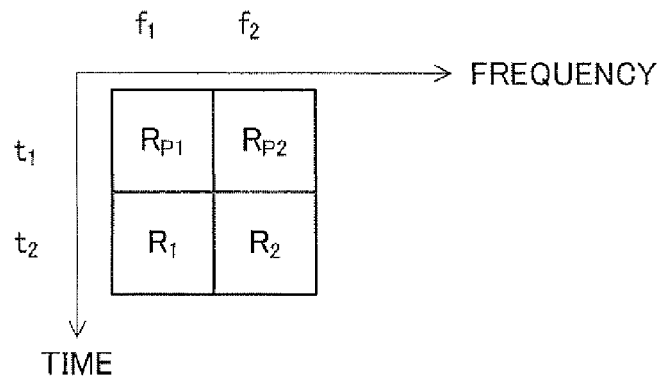
FIG. 6 illustrates received symbols (mobile station MS) according to Embodiment 1 of the present invention.

FIG. 6 shows received symbols at mobile station MS. The pilot symbols received by subcarriers $f_1$ and $f_2$ at time $t_1$ are $R_{P1}$ and $R_{P2}$. The data symbols received by subcarriers $f_1$ and $f_2$ at time $t_2$ are $R_1$ and $R_2$. Data symbols $R_1$ and $R_2$ include desired wave data symbols $S_1$ and $S_1'$ and interfering wave data symbols $I_1$ and $I_1'$.

Mobile station MS determines channel estimation values $h_1$ and $h_2$ for subcarriers $f_1$ and $f_2$, using pilot symbols $R_{P1}$ and $R_{P2}$, and generates channel estimation value vector H, expressed in equation 1.

$$H = \begin{bmatrix} h_1 \\ h_2 \end{bmatrix} \quad \text{(Equation 1)}$$

Next, using pilot symbols $R_{P1}$ and $R_{P2}$ as reference symbols, mobile station MS generates cross-correlation matrix R for the received signal, expressed in equation 2.

$$R = \begin{bmatrix} R_{p1}(R_{p1})^* & R_{p1}(R_{p2})^* \\ R_{p2}(R_{p1})^* & R_{p2}(R_{p2})^* \end{bmatrix} \quad \text{(Equation 2)}$$

Next, mobile station MS derives optimal weight vector W (Weiner solution) for each data symbol $R_1$ and $R_2$, according to equation 3. That is, mobile station MS determines MMSE-based interference reducing weights $w_1$ and $w_2$.

$$W = R^{-1} \cdot H = \begin{bmatrix} w_1 \\ w_2 \end{bmatrix}$$ (Equation 3)

Incidentally, generating cross-correlation matrix R and deriving weight vector W are performed at weight calculation section 209 shown in FIG. 3.

Figure 7A:
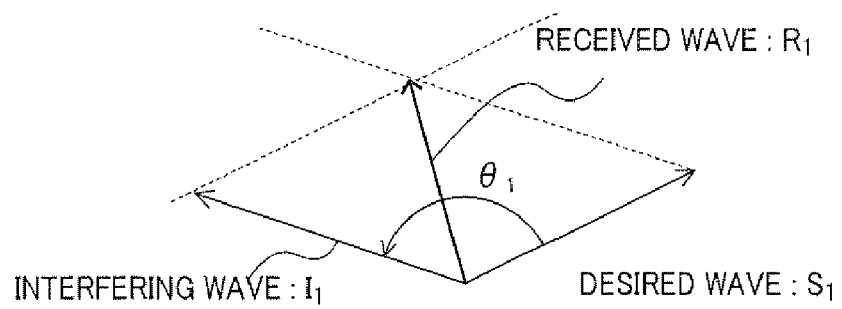
FIG. 7A illustrates relations among received wave, desired wave and interfering wave, according to Embodiment 1 of the present invention.
Figure 7B:
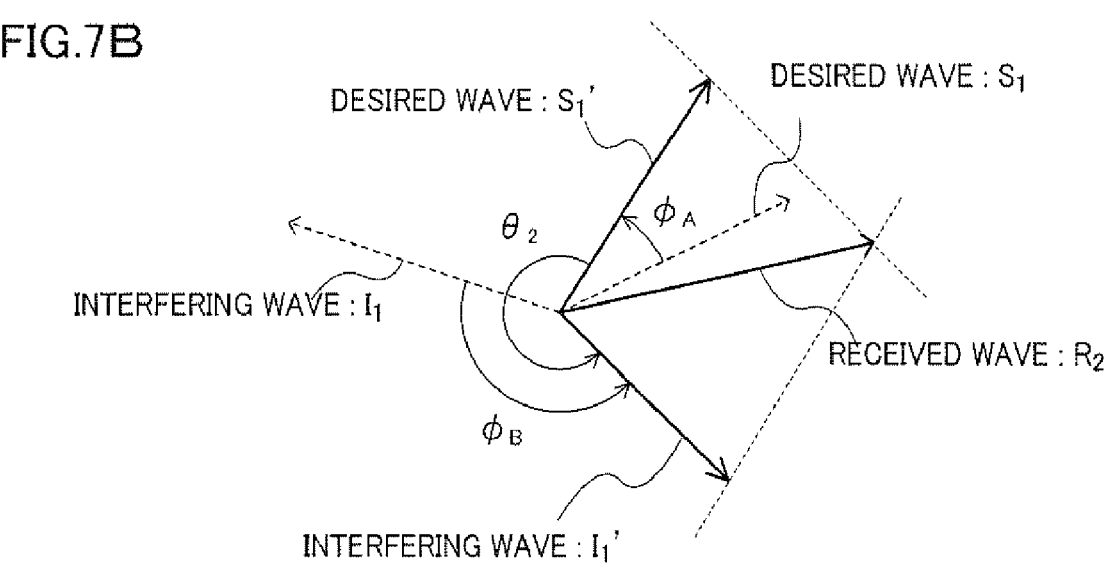
FIG. 7B illustrates relations among received wave, desired wave and interfering wave, according to Embodiment 1 of the present invention.

In this way, upon deriving weight vector W, mobile station MS needs to calculate inverse matrix $R^{-1}$ of cross-correlation, matrix R. Due to high correlation in channel variation between the neighboring subcarriers, if phase difference $\phi_1$ between the desired wave and the interfering wave in subcarrier $f_1$ and phase difference $\phi_2$ between the desired wave and the interfering wave in subcarrier $f_2$ (that is, if $R_{P1}$ is equal to $R_{P2}$) have substantially same angles, inverse matrix $R^{-1}$ cannot be calculated, which results in so-called rank-deficient, and which makes it not possible to derive weight vector W. However, as described above, the present embodiment applies the phase rotation difference between subcarriers $f_1$ and $f_2$ to $\phi_A$ at base station and $\phi_B$ at base station $BS_B$, and makes different the phase rotation difference between neighboring subcarriers between in base stations $BS_A$ and $BS_B$. This prevents phase difference $\phi_1$ in subcarrier $f_1$ and phase difference $\phi_2$ in subcarrier $f_2$ from having the same angle, thereby making rank-deficient less likely. If phase rotation $\phi_A$ is 20 degrees and $\phi_B$ is 130 degrees, for example, the relationships between received waves $R_1$ and $R_2$, desired waves $S_1$ and $S_1'$ and interfering waves I1 and I1' are as shown in FIGS. 7A and 7B, and phase difference $\phi_1$ in subcarrier $f_1$ and phase difference $\phi_2$ in subcarrier $f_2$ can be made different. Consequently, the present embodiment makes it possible to derive weight vector W, and, as a result, even when repetition technology is used in multicarrier communication, it is possible to provide an advantage of reducing interference by MMSE combining.

Here, to optimize the advantage of reducing interference, it is preferable to maximize the phase rotation difference between neighboring cells.

In the case of a two-cell model as described in FIG. 4, for example, it is preferable that the difference between phase rotation difference $\phi_A$ in cell A and phase rotation difference $\phi_B$ in cell B is 180 degrees. For this reason, for example, with regards to the same two symbols allocated to neighboring subcarriers $f_1$ and $f_2$ as shown in above FIGS. 5A and 5B, the phase rotation angles at base station $BS_A$ are $(\phi_1, \phi_2)=(0$ degree, 0 degree), and the phase rotation angles at base station $BS_B$ is $(\phi_1, \phi_3)=(0$ degree, 180 degrees).

Figure 8:
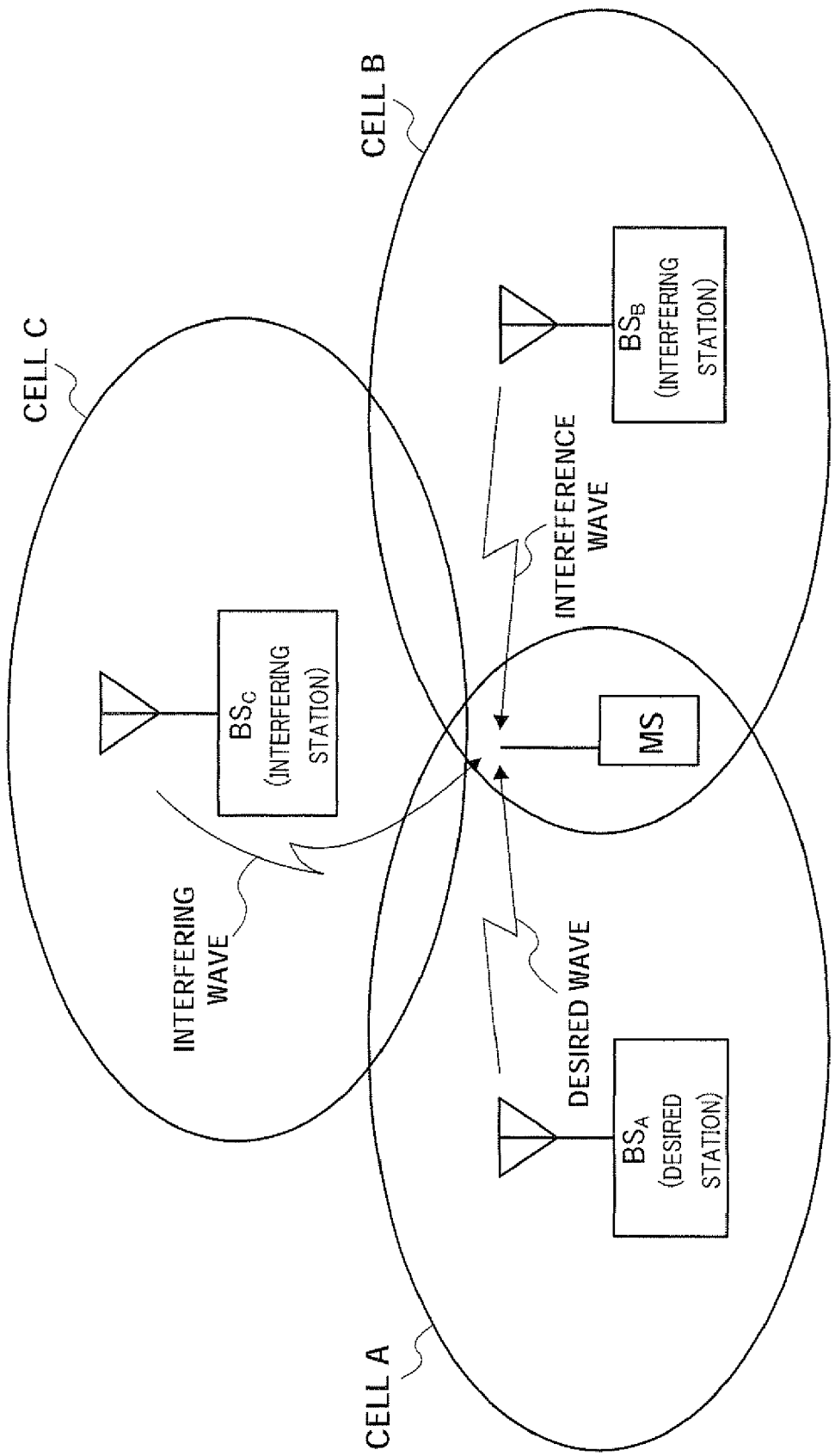
FIG. 8 illustrates an example of cell arrangement (three cell model) according to Embodiment 1 of the present invention.

Moreover, in the case of a three-cell model as described in FIG. 8, it is preferable that the difference between phase rotation difference $\phi_A$ in cell A, phase rotation difference $\phi_B$ in cell B and phase rotation difference $\phi_C$ in cell C is each 120 degrees.

Figure 9A:
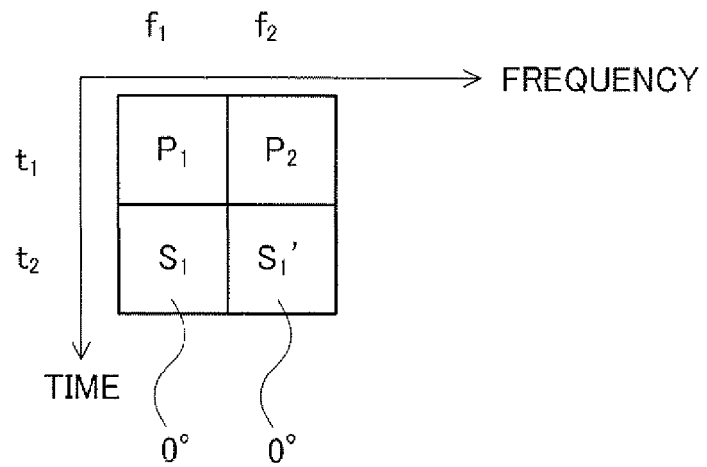
FIG. 9A illustrates a phase rotation (base station $BS_A$) according to Embodiment 1 of the present invention.
Figure 9B:
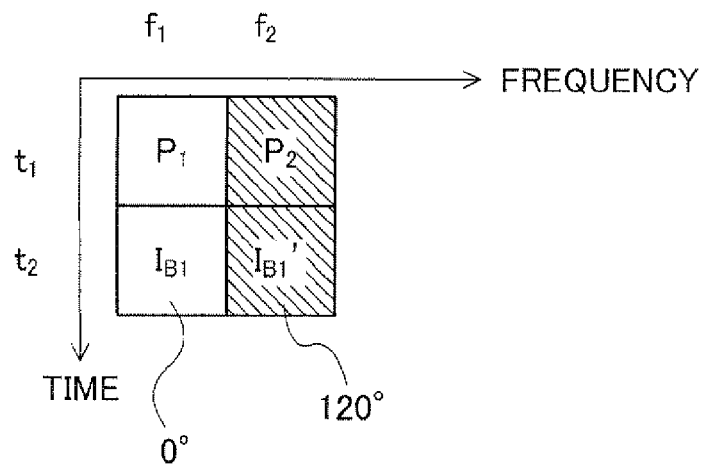
FIG. 9B illustrates a phase rotation (base station $BS_B$) according to Embodiment 1 of the present invention.
Figure 9C:
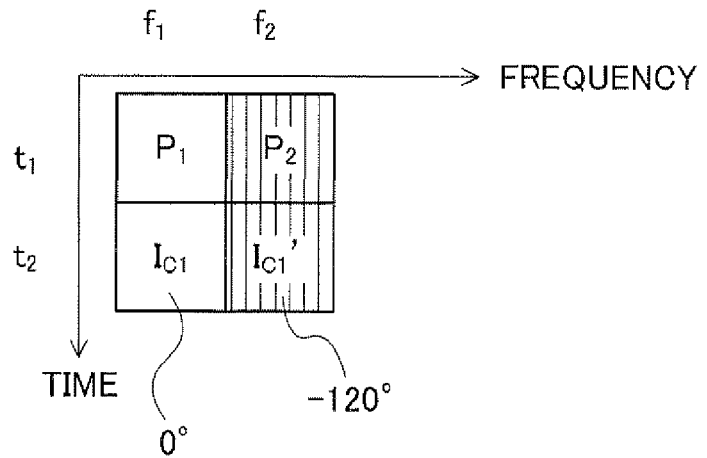
FIG. 9C illustrates a phase rotation (base station $BS_C$) according to Embodiment 1 of the present invention.

For this reason, for example, with regards to the same two symbols allocated to neighboring subcarriers $f_1$ and $f_2$ as shown in above FIGS. 9A to 9C, the phase rotation angles at base station $BS_A$ are (0 degree, 0 degree) as shown in FIG. 9A (that is, phase rotation difference $\phi_A$ is 0 degree), the phase rotation angles at base station $BS_B$ are (0 degree, 120 degrees) as shown in FIG. 9B (that is, phase rotation difference $\phi_B$ is 120 degrees), and phase rotation angle in base station $BS_C$ is (0 degree, -120 degrees) as shown in FIG. 9C (that is, phase rotation difference $\phi_C$ is -120 degrees).

Figure 10A:
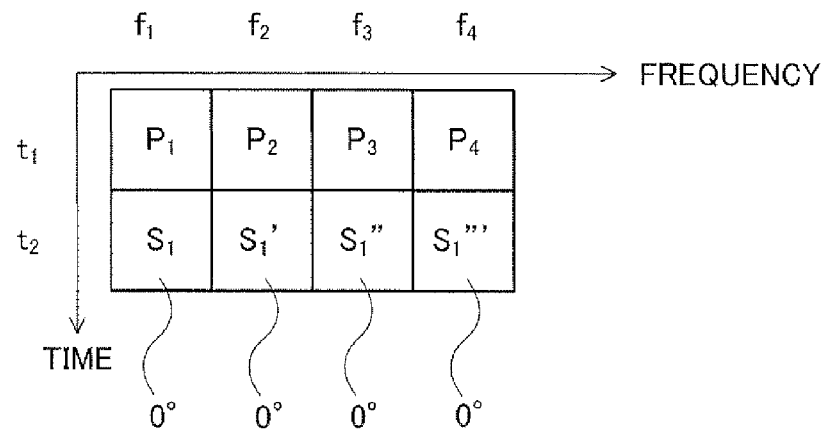
FIG. 10A illustrates a phase rotation (base station $BS_A$) according to Embodiment 1 of the present invention.
Figure 10B:
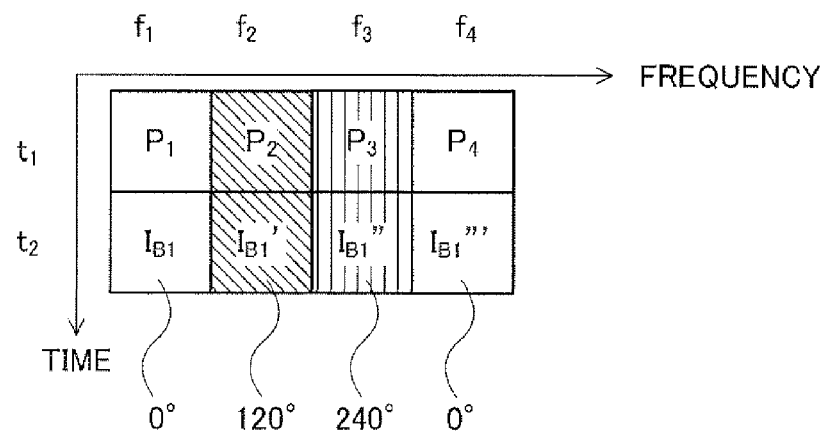
FIG. 10B illustrates a phase rotation (base station $BS_B$) according to Embodiment 1 of the present invention.
Figure 10C:
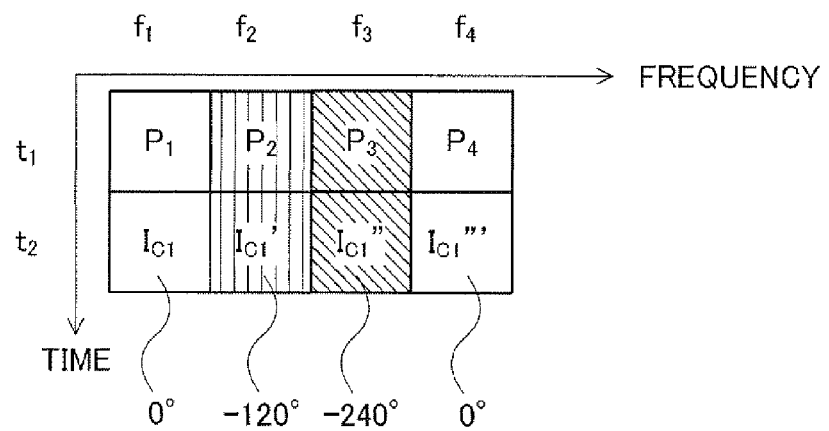
FIG. 10C illustrates a phase rotation (base station $BS_C$) according to Embodiment 1 of the present invention.

Likewise, with regards to the same four symbols allocated to neighboring subcarriers $f_1$ to $f_4$ as shown in above FIGS. 10A to 10C, phase rotation angle in base station $BS_A$ is (0 degree, 0 degree, 0 degree, 0 degree) as shown in FIG. 10A (that is, phase rotation difference $\phi_A$ is 0 degree), phase rotation angle in base station $BS_B$ is (0 degree, 120 degrees, 240 degrees, 0 degree) as shown in FIG. 10B (that is, phase rotation difference $\phi_B$ is 120 degrees), phase rotation angle in base station $BS_C$ is (0 degree, -120 degrees, -240 degrees, 0 degree) as shown in FIG. 10C (that is, phase rotation difference $\phi_C$ is -120 degrees).

In this way, according to the present embodiment, base stations in neighboring cells, apply a phase rotation to a plurality of the same symbols, at angles according to the number of neighboring cells. For example, in the case of a two-cell model as above in FIG. 4, cell B is the only neighboring cell for cell A, and, in the case of a three-cell model as above in FIG. 8, cell A has two neighboring cells, cell B and cell C. Then, base station $BS_A$ applies the phase rotation at the angle, which is derived from equation 4, to a plurality of the same symbols symbols.

Phase rotation angle=$n\times(360$ degrees/(the number of neighboring cells+1)), where $n$ is an integer (Equation 4)

Figure 11:
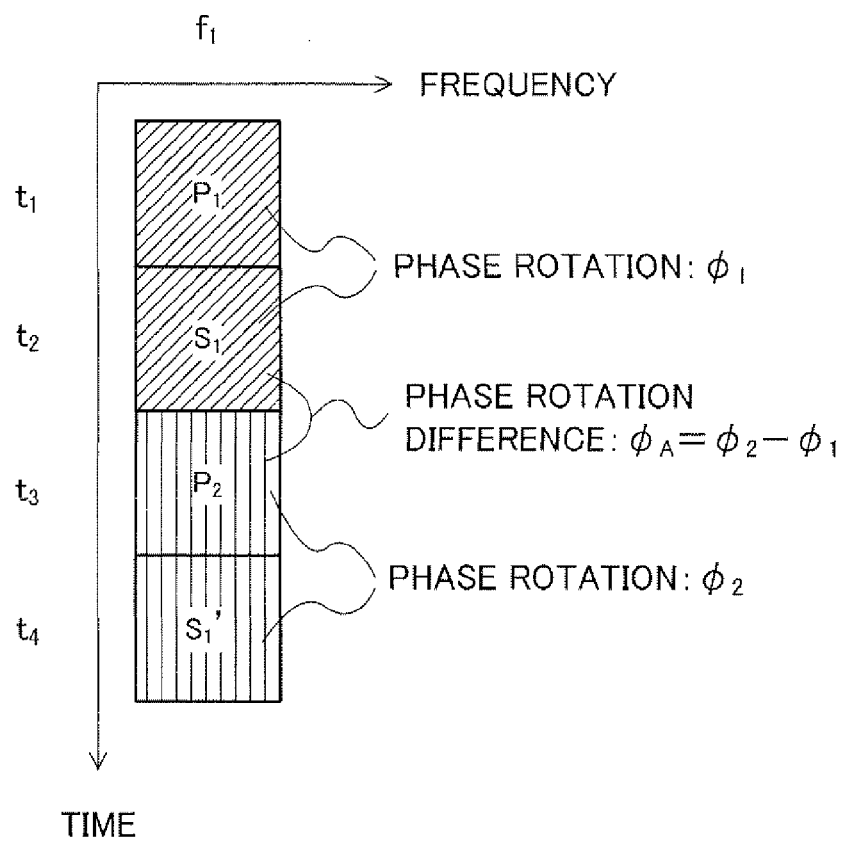
FIG. 11 illustrates a phase rotation (time domain allocation) according to Embodiment 1 of the present invention.

Besides, cases have been described above where a plurality of the same data symbols generated by repetition are mapped to neighboring subcarriers (frequency domain mapping). However, as shown in FIG. 11, the present invention can be implemented as described above, when a plurality of the same data symbols $S_1$ and $S_1'$ generated by repetition are mapped to the same subcarrier at different times (time domain mapping).

Figure 12:
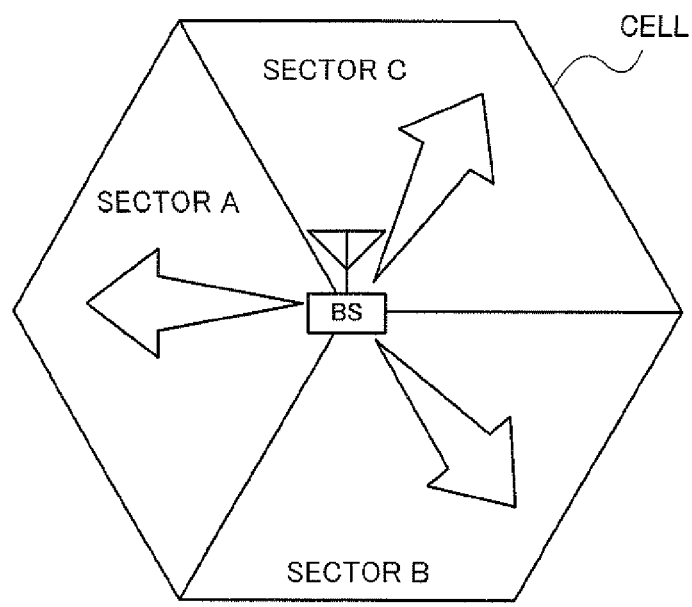
FIG. 12 shows an example of sectors arrangement (three sectors model) according to Embodiment 1 of the present invention.

Moreover, although cases have been described above where the present invention is implemented between neighboring cells, the present invention can be implemented between neighboring sectors in a cell, as described above. For example, in the case of a three-sector model as above in FIG. 12, the present invention can be implemented in the same way as in the case of a three-cell model shown in FIG. 8 above. That is, the present invention can be implemented as the described above, by assuming that cell A, cell B and cell C are sector A, sector B and sector C, respectively. However, when the present invention is implemented between neighboring sectors, base station BS shown in FIG. 12 applies phase rotation at an angle according to the number of sectors in one cell, to a plurality of the same symbols. To be more specific, base station BS applies phase rotation at an angle derived from equation 5, to each of the plurality of the same symbols. This makes it possible to increase the difference in phase rotation differences between neighboring sectors as much as possible and bring about the advantage of interference reduction at a maximum.

Phase rotation angle=$n\times(360$ degrees/the number of neighboring sectors in one cell), where $n$ is an integer (Equation 5)

Moreover, the phase rotation difference at the desired station may be made variable according to the phase rotation difference of the interfering wave estimated at a mobile station. For example, in the case of a two-cell model as above in FIG. 4, after interfering wave phase rotation difference $\phi_B$ is estimated, mobile station MS calculates phase rotation difference $\phi_A$ that is optimal for reducing the interference of the desired wave, and this phase rotation difference $\phi_A$ may be reported to desired station $BS_A$. Moreover, when interfering wave phase rotation difference $\phi_B$ can be varied in interfering station $BS_B$, phase rotation difference $\phi_B$ may be reported to desired station $BS_A$ via base station network.

Moreover, although cases have been described above where the present invention is applied to downlink, the present application may be applied to uplink as well. For example, a base station designates different phase rotation angles to two mobile stations $MS_A$ and $MS_B$ in its cell, and mobile stations $MS_A$ and $MS_B$ apply phase rotation processing at angles designated by the base station and perform transmission at synchronized transmission timings. Then, the base station separates the data symbols from mobile stations $MS_A$ and the data symbols from mobile stations $MS_B$ by interference reduction by MMSE combining.

Embodiment 2

A base station according to the present embodiment transmits information to report an angle of a phase rotation, to a mobile station.

The present embodiment is the same as Embodiment 1 in that control station RNC as shown in FIG. 1 above transmits control data A to base station $BS_A$ (that is, desired station) of cell A and transmits control data B to base station $BS_B$ (that is, interfering station) of cell B. However, the present embodiment is different from the Embodiment 1 in that phase rotation angle A, which is unique to base station $BS_A$, and phase rotation angle B, which is unique to base station $BS_B$, are both included in control data A and control data B.

Figure 13:
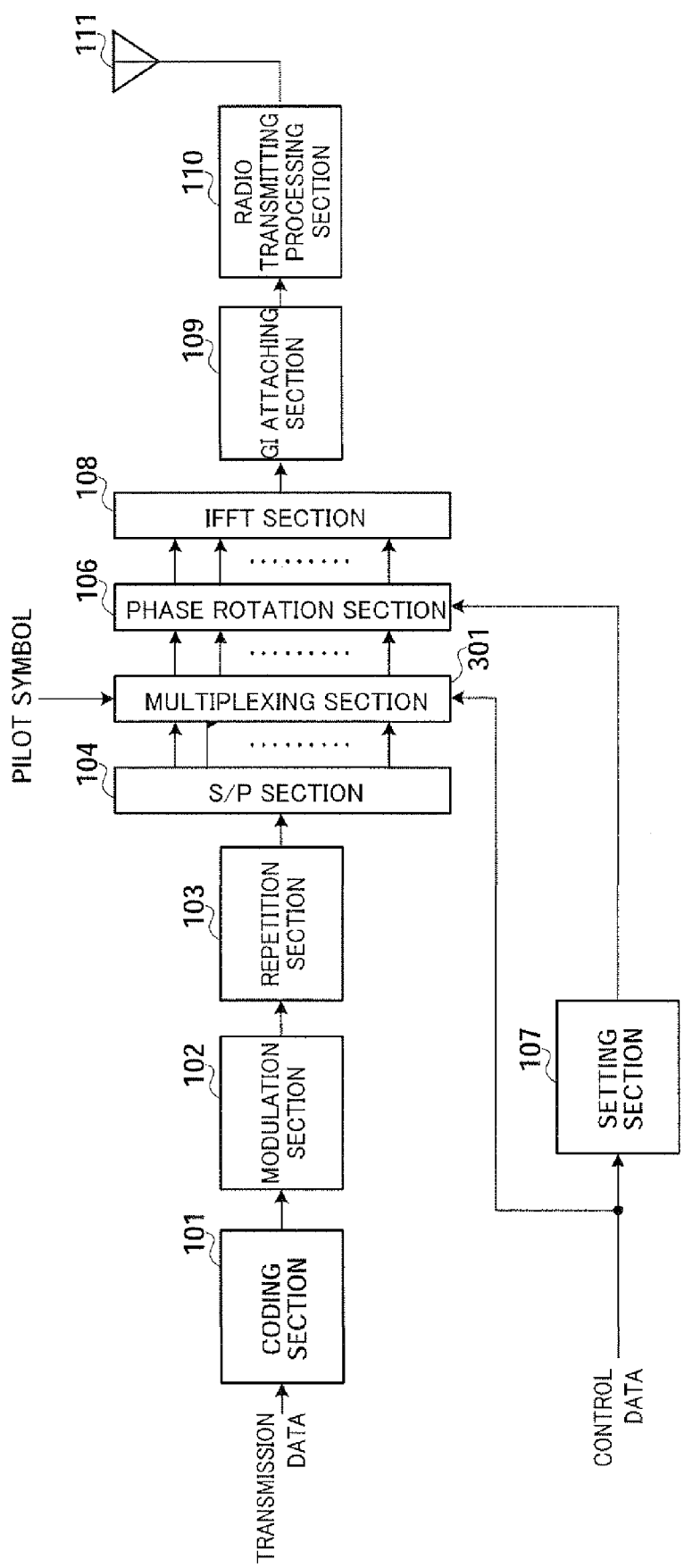
FIG. 13 is a block diagram showing the configuration of a base station, according to Embodiment 2 of the present invention.

FIG. 13 shows the configuration of base station 300 according to the present embodiment. In the present embodiment, base station $BS_A$ and base station $BS_B$ shown in FIG. 1 have the same configuration as shown in FIG. 13. FIG. 13 assigns the same reference numerals to the same parts as in Embodiment 1 (FIG. 2) and will omit explanations.

In base station 300, every time a predetermined number of data symbols (for example, one frame) are inputted from S/P section 104, multiplexing section 301 selects and outputs the pilot symbols, thereby time multiplexing the data symbols and the pilot symbols. Moreover, multiplexing section 301 time multiplexes the data symbols and, phase rotation angle A, which is unique to base station $BS_A$ and phase rotation angle B, which is unique to base station $BS_B$ included in the control data received from control station RNC shown in FIG. 1, as report information of phase rotation angles. This processing allows base station 300 to transmit information for reporting the angle of phase rotation, to a mobile station. This report information is transmitted using a control channel.

Figure 14:
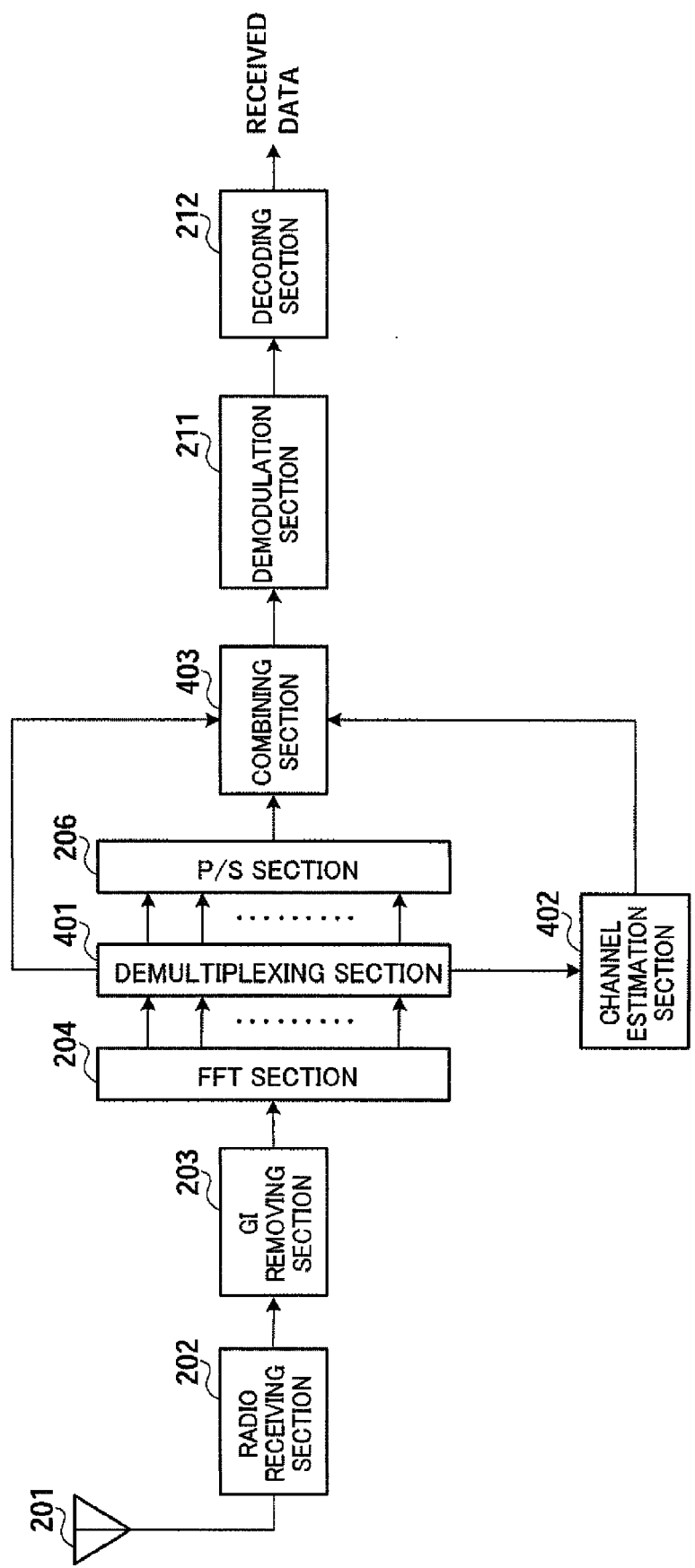
FIG. 14 is a block diagram showing the configuration of a mobile station, according to Embodiment 2 of the present invention.

On the other hand, FIG. 14 shows the configuration of base station 400 according to the present embodiment. FIG. 14 assigns the same reference numerals to the same parts as in Embodiment 1 (FIG. 3) and will omit, explanations. Mobile station 400 according to the present embodiment is different from Embodiment 1 in that cross correlation R is not generated and symbol combining is performed using phase rotation angle A, which is unique to base station $BS_A$ and phase rotation angle B, which is unique to base station $BS_B$, which are reported in the control channel.

In mobile station 400, demultiplexing section 401 divides the symbols inputted from FFT section 204 into pilot symbols, data symbols and reported information of phase rotation angle, outputs the data symbols to P/S section 402, outputs the pilot symbol to channel estimation section 402, and outputs reported information of phase rotation angle to combining section 403.

Channel estimation section 402 determines the channel estimation values (for example, channel variation level) for each subcarrier using the pilot symbols, and outputs the channel estimation values to combining section 403.

The processing at combining section 403 will be described below.

Figure 15A:
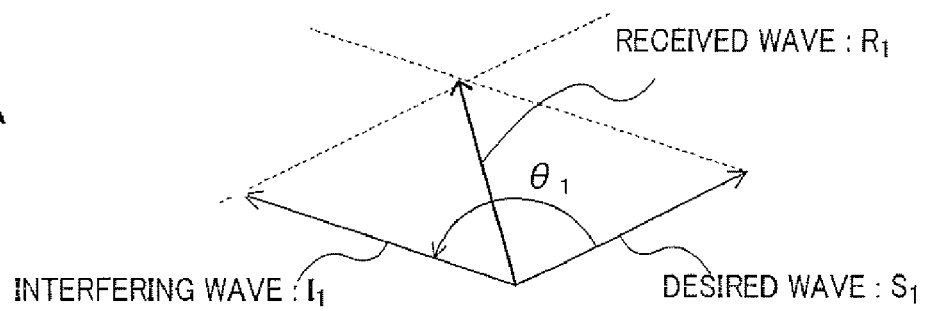
FIG. 15A illustrates the operation of combining section of the mobile station, according to Embodiment 2 of the present invention.
Figure 15B:
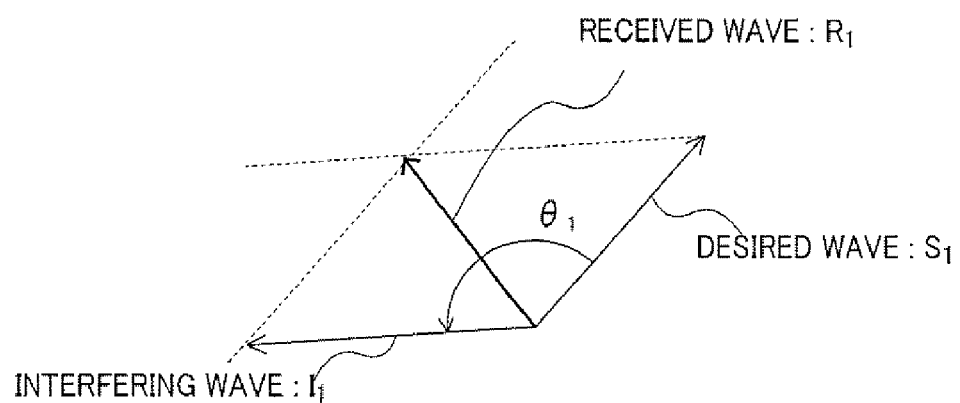
FIG. 15B illustrates the operation of combining section of the mobile station, according to Embodiment 2 of the present invention.

First, combining section 403 performs phase compensation on received wave $R_1$ shown in FIG. 15A (which is received symbol $R_1$ in FIG. 6) using channel estimation value $h_1$ for subcarrier $f_1$. FIG. 15B shows received wave $R_1$ after phase compensation.

Figure 16A:
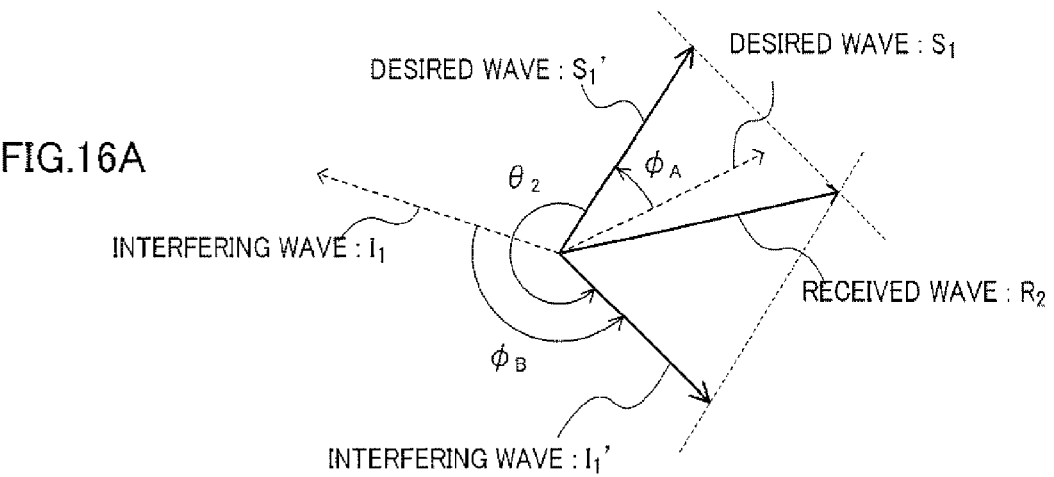
FIG. 16A illustrates the operation of combining section of the mobile station, according to Embodiment 2 of the present invention.
Figure 16B:
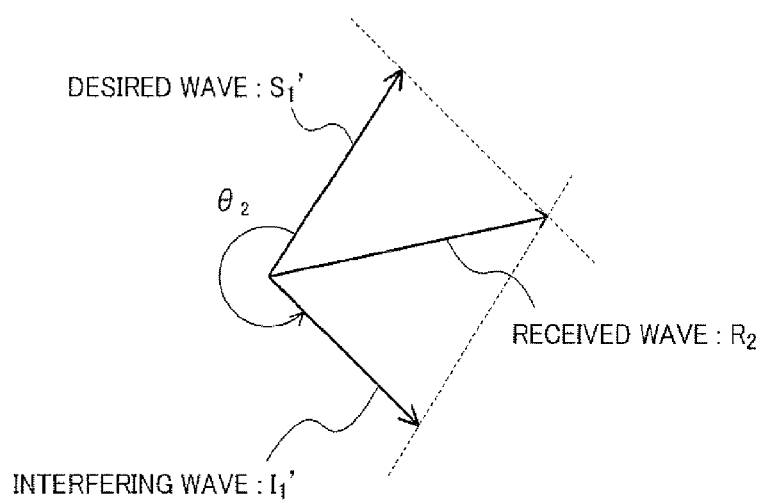
FIG. 16B illustrates the operation of combining section of the mobile station, according to Embodiment 2 of the present invention.

Likewise, combining section 403 performs phase compensation on received wave $R_2$ shown in FIG. 16A (which is received symbol $R_2$ in FIG. 6) using channel estimation value $h_2$ for subcarrier $f_2$. FIG. 16B shows received wave $R_2$ after phase compensation. Moreover, received wave $R_2$ after phase compensation is phase-rotated by $\phi_\alpha = 180$ degrees$-\phi_\beta$. By this means, interference components $I_1$ (FIG. 15B) in received wave $R_2$ and interference components $I_1'$ (FIG. 16C) in received wave $R_2$ are antiphase.

Figure 16C:
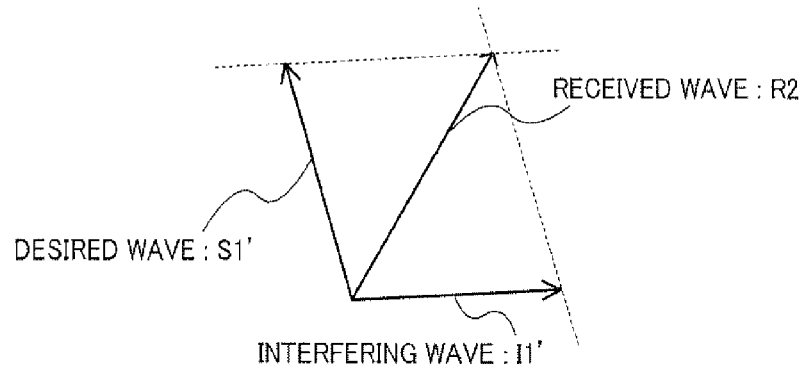
FIG. 16C illustrates the operation of combining section of the mobile station, according to Embodiment 2 of the present invention.
Figure 17A:
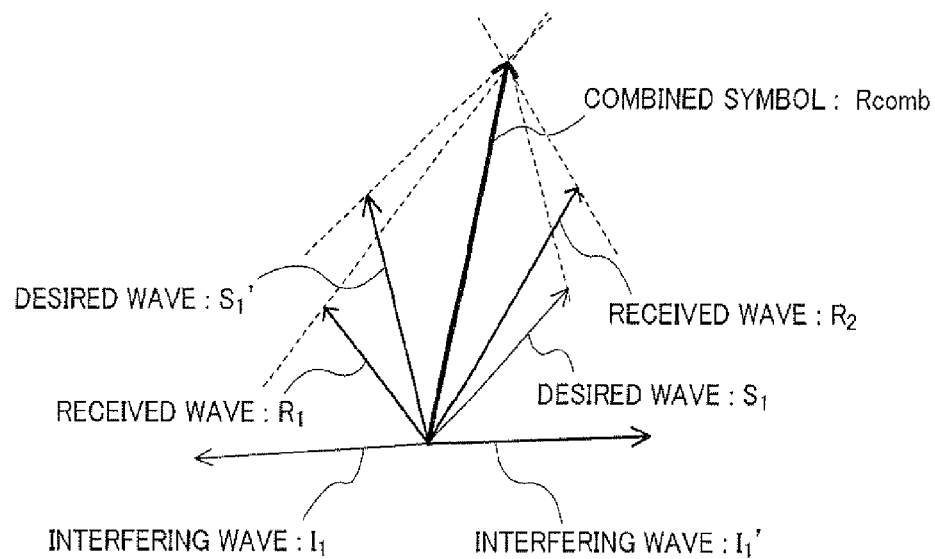
FIG. 17A illustrates the operation of combining section of the mobile station, according to Embodiment 2 of the present invention.
Figure 17B:
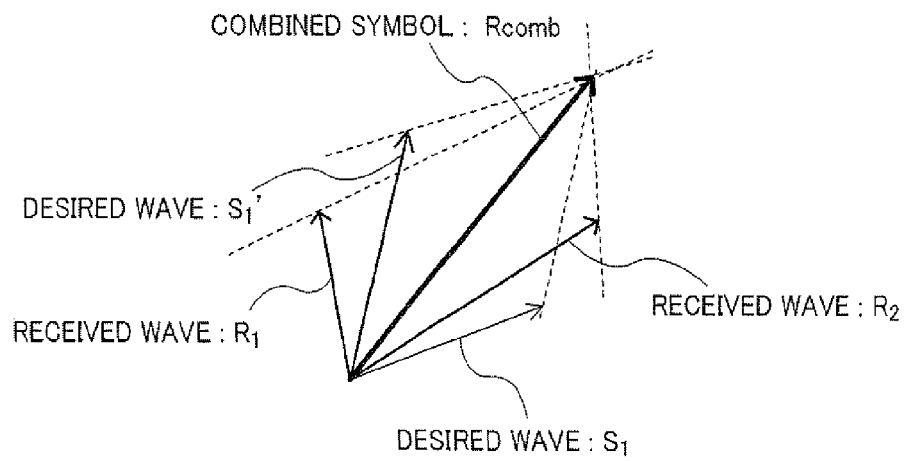
FIG. 17B illustrates the operation of combining section of the mobile station, according to Embodiment 2 of the present invention.

Consequently, as shown in FIG. 17A, by combining received wave $R_1$ shown in FIG. 15B and received wave $R_2$ shown in FIG. 16C, interference components $I_1$ and interference components $I_1'$ are compensated, and combined symbol $R_{comb}$ is included only in desired wave components. Then, combined symbol $R_{comb}$ phase shown in FIG. 17A is rotated back by $(\phi_A + \phi_\alpha)/2$, so that the desired symbol can be obtained (FIG. 17B).

In this way, in the present embodiment makes it possible to perform interference reducing symbol combining without generating cross-correction matrix R.

Incidentally, base station may be referred to as "Node-B", a subcarrier may be referred to as "tone", and a pilot symbol may be referred to as "reference symbol".

Moreover, MMSE-based interference reduction may be referred to as "interference suppression by ZF (Zero Forcing)". Furthermore, equations for performing MMSE-based interference reduction are not limited to equations 1 to 3.

Moreover, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-157452, filed on May 30, 2005, the entire content of which is expressly incorporated by reference herein.

INDUSTRIAL APPLICABILITY

The present invention is applicable to, for example, mobile communication systems.

The invention claimed is:

1. A wireless communication base station apparatus, transmitting a multicarrier signal formed with a plurality of subcarriers to a wireless communication mobile station apparatus, the wireless communication base station apparatus comprising:
    a repetition section that repeats a symbol and generates a plurality of same symbols;
    a phase rotation section that applies a phase rotation to the plurality of the same symbols; and
    a transmission section that transmits the multicarrier signal in which the plurality of the same symbols after the phase rotation are allocated to the plurality of subcarriers,
    wherein the phase rotation section makes cell specific or sector specific phase rotation difference between the plurality of the same symbols, and
    wherein the phase rotation section makes the phase rotation difference between the plurality of the same symbols different from a phase rotation difference between same symbols in a different cell or sector.

2. A wireless communication base station apparatus according to claim 1, wherein the phase rotation section applies the phase rotation using an angle in accordance with the number of different cells or sectors.

3. A wireless communication base station apparatus according to claim 1, wherein the phase rotation section applies the phase rotation using an angle determined by n×(360 degrees/(the number of different cells+1) or at an angle determined by n×(360 degrees/the number of different sectors in one cell), where n is an integer.

4. A wireless communication base station apparatus according to claim 1, wherein the transmission section transmits information to report the phase rotation angle, to the wireless communication mobile station apparatus.

5. A wireless communication method comprising, upon applying a phase rotation to a plurality of same symbols allocated to a plurality of subcarriers forming a multicarrier signal, making a cell specific or sector specific phase rotation difference between the plurality of the same symbols in the plurality of different cells or in the plurality of different sectors, and making different the cell specific or sector specific phase rotation differences between different cells or sectors.

6. The wireless communication method according to claim 5, comprising allocating the plurality of the same symbols to neighboring subcarriers.

* * * * *